Jan. 8, 1952     C. W. SHERWIN     2,582,208
SYNCHRO EXCITER
Filed April 16, 1946
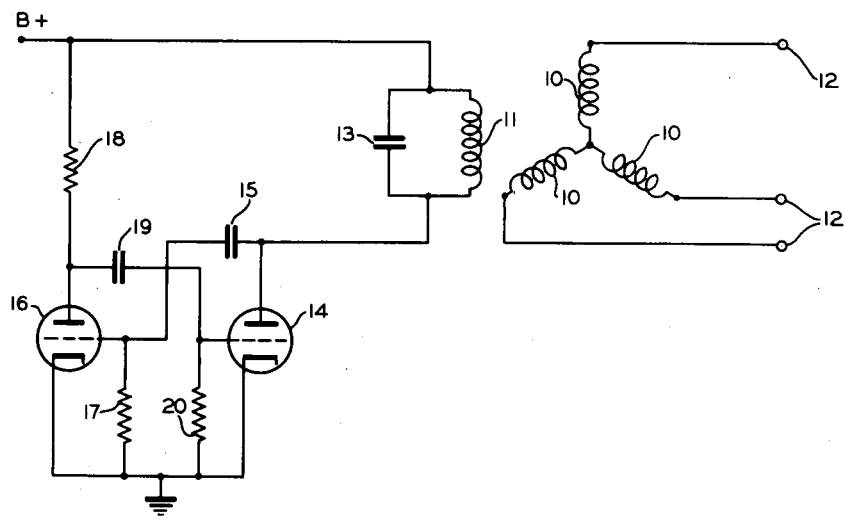
INVENTOR
CHALMERS W. SHERWIN
BY *M. O. Hayes*
ATTORNEY Patented Jan. 8, 1952

2,582,208

UNITED STATES PATENT OFFICE 2,582,208

SYNCHRO EXCITER

Chalmers W. Sherwin, Leonia, N. J., assignor, by mesne assignments, to the United States of America as represented by the Secretary of the Navy Application April 16, 1946, Serial No. 662,463

4 Claims. (Cl. 177—380)

This invention relates to synchro systems and more specifically to a method of exciting a synchro with an alternating current signal.

In many applications it is desirable to excite a synchro with an alternating signal in the audible frequency range. This may be done most efficiently by making the synchro rotor part of a circuit resonant at the desired frequency. The resonant circuit, including the synchro rotor, may then be used as the tank circuit of an electron tube oscillator.

The object of this invention is to provide an efficient system for exciting a synchro with an alternating current.

Another object is to provide a synchro exciting system whereby the synchro rotor is part of a resonant circuit.

A further object is to provide an electron tube oscillator using a synchro rotor as part of the resonant circuit.

These and other objects will be apparent from the following specification when considered with the accompanying drawing, the single figure of which shows a schematic diagram of an embodiment of the invention.

Referring to the accompany drawing, a conventional synchro is shown composed of the stator windings 10 and rotor winding 11. Output of the synchro is taken at terminals 12. A capacitor 13 forms a parallel resonant circuit with rotor winding 11. The plate of an electron tube 14 is connected through the parallel combination of the rotor winding 11 and capacitor 13 to a source of plate potential B+. The cathode of tube 14 connects to ground. A capacitor 15 couples from the plate of tube 14 to the grid of a second electron tube 16. The grid of tube 16 connects to ground through a resistor 17 and the cathode of tube 16 is grounded. A resistor 18 connects from the plate of tube 16 to the source of plate potential B+. Capacitor 19 couples from the plate of tube 16 to the grid of tube 14. Resistor 20 connects from the grid of tube 14 to ground.

In operation, the parallel combination of capacitor 13 and the rotor winding 11 form the resonant circut of an electron tube oscillator. Tube 14 is the oscillator tube and tube 16 and the associated circuit form the feedback circuit for the oscillator. The signal at the plate of tube 14 is coupled to the grid of tube 16 by capacitor 15. This signal is amplified by tube 16 and is reversed in phase. The signal at the plate of tube 16 is coupled to the grid of tube 14 by capacitor 19. Thus the signal at the grid of tube 14 is of the opposite phase to the signal at the plate of tube 14. This condition will cause oscillation to occur at the resonant frequency of the circuit formed by rotor 11 and capacitor 13. Thus the rotor winding 11 will be excited with an alternating current.

The frequency of the oscillation may be controlled by variation of capacitor 13. The frequency of the oscillation will be reasonably constant as the inductance of rotor winding 11 does not change appreciably as it is rotated. If the rotor 11 is of the type known as distributed wound, the change in inductance with angle of rotation is very small.

Other forms of oscillators may be used. For example, a transformer may be used to provide the feedback or a Colpitt's type of oscillator may be constructed using the rotor winding 11 as the inductance. The novel features of the invention include; the excitation of a synchro by resonating the excited rotor by a parallel capacitor at the frequency of the exciting alternating current, and the inclusion of the excited rotor as an element of the resonant circuit of an electron tube oscillator.

While a particular embodiment of the invention has been illustrated and described, it is to be understood that the invention is not to be limited thereby in its details of construction and operation, except as appears hereafter in the claims.

What is claimed is:

1. An excitation circuit for a synchro having a rotatable rotor coil comprising, an oscillator having a tank capacitance, and means connecting said rotor coil in shunt with said capacitance, whereby said rotor coil comprises the tank inductance of said oscillator.

2. Apparatus for exciting angular motion transmission apparatus having relatively rotatable primary and secondary windings comprising, an oscillator energized from a direct current source and having a tank capacitance, and means connecting said capacitance in shunt with said primary winding.

3. Apparatus for exciting angular motion transmission apparatus having relatively rotatable primary and secondary windings comprising, an electron tube oscillator including a source of direct current voltage source for energizing said oscillator and a frequency determining circuit including a tank capacitance, and means connecting said capacitance in shunt with said primary winding.

4. Apparatus for exciting angular motion transmission apparatus having relatively rotatable primary and secondary windings comprising, an oscillator having a tank capacitance and a direct current energizing source, and means connecting said capacitance in shunt with said primary winding whereby said primary winding operates as the tank inductance of said oscillator.

CHALMERS W. SHERWIN.

REFERENCES CITED

The following references are of record in the file of this patent:

UNITED STATES PATENTS

| Number | Name | Date |
|---|---|---|
| 416,006 | Moennich | Nov. 26, 1889 |
| 2,420,160 | Adamson | May 6, 1947 |